Figure 1:
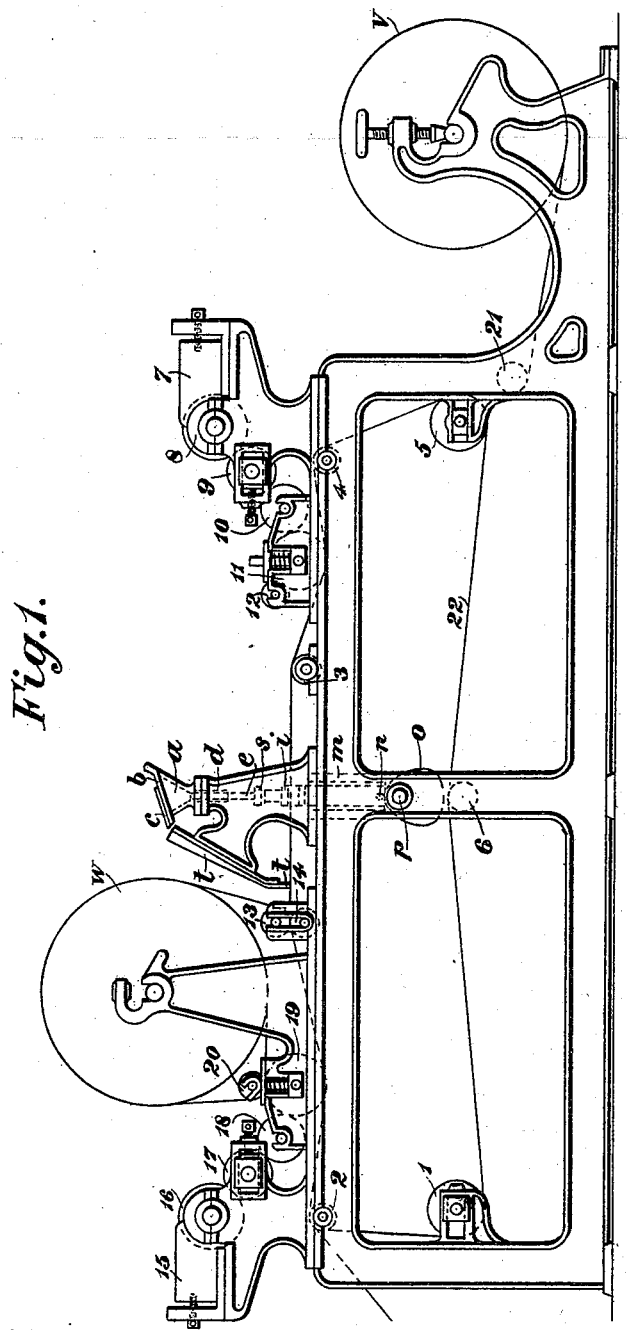

No. 623,081.  
Patented Apr. 11, 1899.

W. EVANS.
MACHINE FOR PREPARING SEED FOR PLANTING.
(Application filed May 10, 1897.)

(No Model.)
3 Sheets—Sheet 3.

Witnesses.
Samuel Percival
Frederick Burnham

Inventor.
William Evans
By his Attorneys.
Wheatley & Mackenzie

UNITED STATES PATENT OFFICE.

WILLIAM EVANS, OF LONDON, ENGLAND, ASSIGNOR TO JOHN WILLIAM MACKENZIE, OF SAME PLACE.

MACHINE FOR PREPARING SEED FOR PLANTING.

SPECIFICATION forming part of Letters Patent No. 623,081, dated April 11, 1899.

Application filed May 10, 1897. Serial No. 635,901. (No model.)

*To all whom it may concern:*

Be it known that I, WILLIAM EVANS, a subject of the Queen of Great Britain and Ireland, residing at Child's Hill, London, in the county of Middlesex, England, have invented certain new and useful Improvements in Machinery for the Preparation of Seeds for Planting and for other Purposes, (for which I have obtained Letters Patent in Great Britain, No. 3,412, bearing date February 16, 1895;) and I do hereby declare the following to be a full, clear, and exact description of the invention, such as will enable others skilled in the art to which it appertains to make and use the same.

This invention for improvements in machinery for the preparation of seeds for planting and for other purposes relates more especially to a method in which the seeds are fixed on or between bands or strips of paper or other suitable material by means of an agglutinant and placed in the ground along with such material; and it consists in providing a machine for picking up singly seeds out of a hopper and distributing them on the surface of the paper in a uniform manner, so that the seeds shall be planted evenly and at a uniform depth to insure a regular growth of the plants. The machine is also applicable for picking up singly and distributing other small articles.

An apparatus for picking up and depositing a single seed consists of a hopper having an inclined cover, of a tube adapted to be reciprocated vertically, so that its upper end passes through the hopper and through a hole in its cover, of a pin or needle situated within the tube, with its upper end below the upper end of the tube and adapted to be reciprocated with the tube and to have a further upward motion when the said tube is in its highest position, so as to project beyond the tube to force out the seed contained therein, and of guides to deposit the said seed on the required spot. In one arrangement a set of needles is fixed to a cross-bar and the tubes are mounted on the needles, and heads on their lower ends rest on helical springs surrounding the said needle. Suitable hollow guides are fixed in the bottom of the hopper for the tubes. The cross-bar is operated vertically and first raises the needles and tubes together, and when the heads come against the ends of the guides the motion of the tubes is arrested and the needles alone are raised, the helical springs being compressed.

In a machine constructed according to this invention a band or several strips of paper are mounted at one end of the machine and pass first over rollers, by which an agglutinant is applied to the upper face, thence under the lower end of the guides to receive the seeds, and thence, together with an upper band or several strips, under pressure-rollers, by which the bands or strips are stuck together with the seeds between. All motions are derived from a single main shaft by suitable mechanism.

Figure 2:
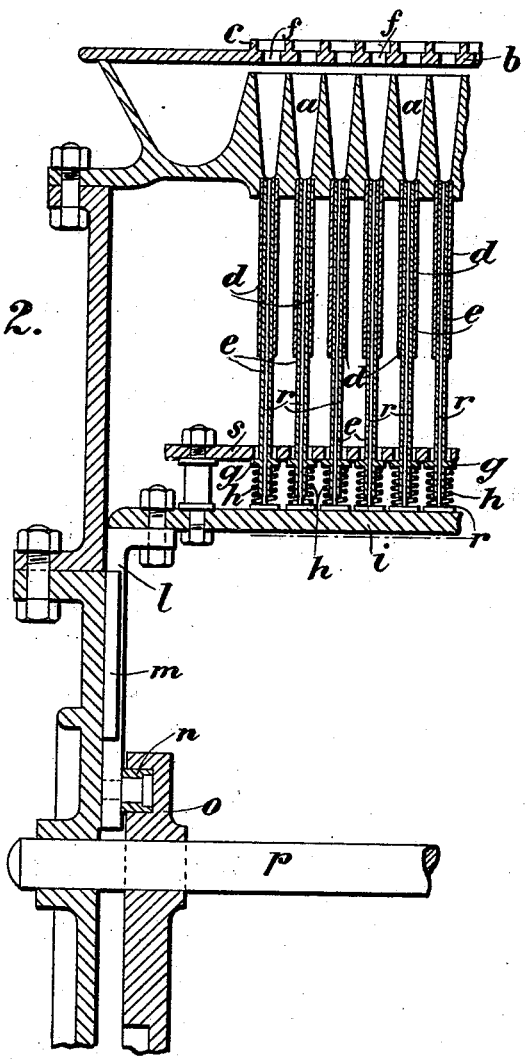
Figure 3:
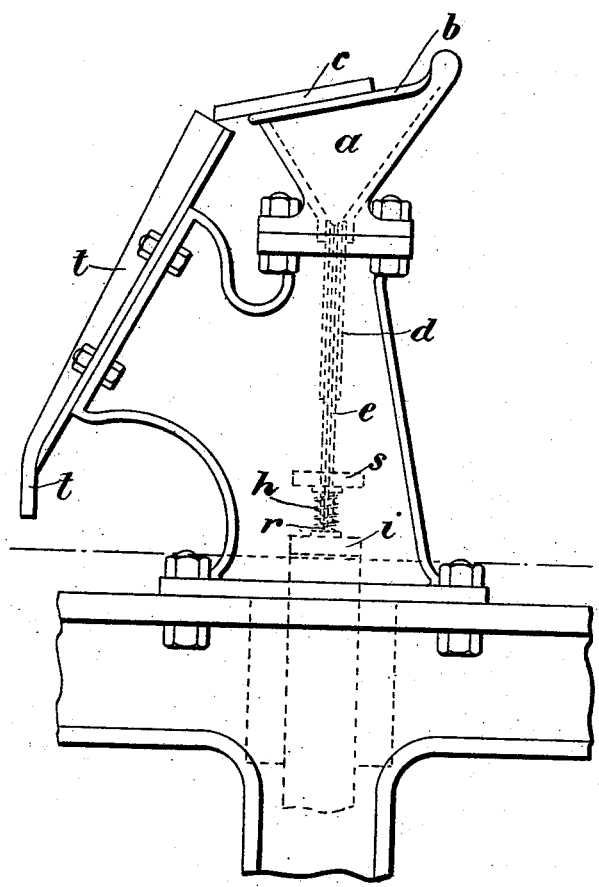

In the accompanying three sheets of illustrative drawings, Figure 1 is an elevation of a machine for the preparation of seeds for planting constructed according to this invention. Fig. 2 is a part vertical section through the seed-hoppers, showing the apparatus for picking up the seeds singly and depositing them at the desired spots on the paper traveling beneath the hopper; and Fig. 3 is a side elevation of the same.

The hoppers $a$, containing the seed, are provided with inclined hinged covers $b$, having guide-ribs $c$ on their upper surface. Fixed in the bottom of the hoppers $a$ are guide-tubes $d$. Picker-tubes $e$, slightly coned at their upper ends, are fitted in the tubes $d$ and are adapted to be reciprocated up through the hoppers and so that their upper ends pass up through the holes $f$ in the covers $b$.

The picker-tubes are provided near their lower ends with collars $g$, and spiral springs $h$ surround their lower ends and bear against the collars and a cross-bar $i$. A vertical reciprocating movement is imparted to the cross-bar by the bars $l$, sliding in guides $m$ in the side frames of the machine and provided at their lower ends with rollers $n$, working in grooves in cams $o$, mounted on the driving-shaft $p$. Fig. 1 shows ordinary cams adapted to raise the cross-bar, the return motion being effected by the weight of the parts or by springs. Within the picker-tubes are needles $r$, rigidly attached to the cross-bar $i$, or, as shown, the spiral springs $h$, bearing against the collars $g$ on the picker-tubes, also bear against the heads of the needles and force the heads firmly against the cross-bar. Above the cross-bar $i$ and rigidly attached to it is a second bar $s$, through holes in which the picker-tubes pass, the collars g being just below it. From the inclined covers guides t lead down to the desired spots just above the surface of the traveling paper on which the seeds are to be arranged.

The action is as follows: Supposing the parts to be in position shown in Fig. 2, the shaft p is rotated and raises the bars l and cross-bars i and s, raising the picker-tubes e and needles r together through the hopper until the ends of the tubes project above the covers b, when the ends of the guide-tubes d will bear against the collars g and prevent any further upward motion. In passing up through the hopper a single seed will lodge on the top of each tube. The cross-bars continue to rise, (the spiral springs h being compressed, as the tubes e cannot rise any farther,) and the needles r are consequently still forced upward until their ends project well above the ends of the picker-tubes e and force the seeds from off their coned seats onto the inclined cover b, whence the seeds fall down the guides t onto the surface of the paper beneath.

The apparatus is also applicable for picking up other articles having a similar shape, such as balls, shot, nuts, fruit, and the like.

The machine is so designed that a band of paper from a roll mounted on the machine is first pasted, then passed under the guide-tubes t from the seed-hopper to receive the seed, and then between the pressure-rollers, where it meets a second band of paper pasted on its under side, so that the seed is fixed between the two bands. The first paper band is mounted in the form of a roll V in bearings at the end of the machine and passes over a guide-roller 21 and over a felt carrier-band 22, guided by the rollers 1, 2, 3, 4, 5, and 6, the roller 1 being the driving-roller. The upper surface of the paper in its traverse comes in contact with the pasting-roller 11, supplied with paste from the paste-reservoir 7 through the rollers 8 9 10, the rollers 8, 9, 10, and 11 running in contact and being covered with felt. The jockey-roller 12 also assists in the even distribution of the paste on the paper. The band passes thence under the guide-tube t, and at this point it is essential that it be horizontal, so that the seeds shall be retained at the point at which they drop onto the paper. The paper, carrying the seeds on its upper surface, passes thence between the pressure-rollers 13 14, where it meets a band of paper passing from the roller W in contact with the pasting-roller 19 back over the roller W, and thence between the rollers 13 and 14, with its pasted surface downward. The paper from the roller W is pressed against the roller 19 by the roller 20, and the roller 19 is supplied with paste from the reservoir 15 through the rollers 16, 17, and 18. The rollers 8 and 9 and also 16 and 17 are driven in opposite directions to distribute the paste more evenly. The main shaft p is also driven by suitable means. The combined paper, with the seeds between, may, if desired, be then passed between heated rollers to dry the paste, and then may be cut up into long strips containing, say, one row of seeds or as desired and wound on a roller mounted at the end of the machine.

The paper is traversed continuously or, if preferred, by a step motion after the deposit of each set of seeds.

What I claim, and desire to secure by Letters Patent, is—

1. A machine for preparing seeds for planting consisting of a set of pasting-rollers, a hopper containing the seeds, a cup or seat reciprocated vertically through the hopper, a means for forcing the seed from off the cup or seat when in its upper position and catching and guiding it to the desired spot, a set of guide-rollers adapted to guide a strip of paper in contact with a pasting-roller, and under the spot where the seed is deposited with its pasted surface uppermost and means for feeding the strip of paper for the deposit of each seed.

2. A machine for preparing seeds for planting, consisting of two sets of rollers, a hopper containing the seeds, a cup or seat reciprocated vertically through the hopper, a means for forcing the seed from off the cup or seat when in its upper position and catching and guiding it to the desired spot, a set of guide-rollers adapted to guide a strip of paper in contact with a pasting-roller and under the spot where the seed is deposited with its pasted surface uppermost, a second set of guide-rollers adapted to guide a second strip of paper in contact with a pasting-roller and against the first strip beyond the place where the seed is deposited and with its pasted surface against the pasted surface of the first strip, a means for pressing the two strips together, and means for feeding the strips of paper for the deposit of each seed.

3. A picking-up apparatus, consisting of a hopper containing the articles to be picked up, a guide-tube opening out from the bottom of the hopper, a tube within the guide-tube, a needle within the tube, a spring connecting the needle and tube, a stop limiting the upward motion of the tube, a means for reciprocating the needle so that as the needle and tube are reciprocated through the hopper a single article is retained on the upper end of the tube and when the upward motion of the tube is stopped the needle passes farther up through the tube and forces the article off the end of the tube, and a means for catching the article as it falls and guiding it to the desired spot.

In testimony whereof I affix my signature in presence of two witnesses.

WILLIAM EVANS.

Witnesses:
JOHN W. MACKENZIE,
ALBERT JONES.